(12) United States Patent
Salapura et al.

(10) Patent No.: US 10,970,061 B2
(45) Date of Patent: *Apr. 6, 2021

(54) ROLLING UPGRADES IN DISAGGREGATED SYSTEMS

(71) Applicant: INTERNATIONAL BUSINESS MACHINES CORPORATION, Armonk, NY (US)

(72) Inventors: Valentina Salapura, Chappaqua, NY (US); John A. Bivens, Ossining, NY (US); Min Li, San Jose, CA (US); Ruchi Mahindru, Elmsford, NY (US); HariGovind V. Ramasamy, Ossining, NY (US); Yaoping Ruan, White Plains, NY (US); Eugen Schenfeld, South Brunswick, NJ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/660,676

(22) Filed: Oct. 22, 2019

(65) Prior Publication Data

US 2020/0050445 A1 Feb. 13, 2020

Related U.S. Application Data

(63) Continuation of application No. 15/398,350, filed on Jan. 4, 2017, now Pat. No. 10,534,598.

(51) Int. Cl.
*G06F 8/65* (2018.01)
(52) U.S. Cl.
CPC ................................ *G06F 8/65* (2013.01)

(58) Field of Classification Search
CPC ....... G06F 8/61; G06F 8/65; G06F 8/66; G06F 12/0891; G06F 2212/1044; G06F 2212/154; G06F 8/60–71
(Continued)

(56) References Cited

U.S. PATENT DOCUMENTS 6,049,851 A 4/2000 Bryg
6,463,584 B1 10/2002 Gard et al.
(Continued)

FOREIGN PATENT DOCUMENTS

WO 2007139542 A1 12/2007

OTHER PUBLICATIONS

Lim et al., "System-level Implications of Disaggregated Memory," 18th International Symposium on High Performance Computer Architecture, IEEE, 2011.
(Continued)

*Primary Examiner* — Andrew M. Lyons
(74) *Attorney, Agent, or Firm* — Griffiths & Seaton PLLC

(57) ABSTRACT

Embodiments for performing rolling software upgrades in a disaggregated computing environment. A rolling upgrade manager is provided for upgrading one or more disaggregated servers. A designated memory area is used for storing an updated software component, and a disaggregated server is switched to the designated memory area from a currently assigned memory area when performing the software upgrade. A process state and program data is maintained in the currently assigned memory area while maintaining the updated software component in the designated memory area such that the process state and program data are read from the currently assigned memory area and the updated software component is read from the designated memory area during currently executing operations of the disaggregated server.

21 Claims, 4 Drawing Sheets

(58) Field of Classification Search
USPC .................................................. 717/168–178
See application file for complete search history.

(56) References Cited

U.S. PATENT DOCUMENTS

| | | | |
|---|---|---|---|
| 6,795,896 B1 | 9/2004 | Hart et al. | |
| 8,819,092 B2 | 8/2014 | Ludwig et al. | |
| 8,856,776 B2 | 10/2014 | Mahajan et al. | |
| 8,938,518 B2 | 1/2015 | Anderson et al. | |
| 9,053,027 B1 | 6/2015 | Harvey et al. | |
| 9,229,707 B2 | 1/2016 | Borissov et al. | |
| 9,262,225 B2 | 2/2016 | Davis et al. | |
| 9,411,648 B2 | 8/2016 | Sims | |
| 9,473,362 B2 | 10/2016 | Fall et al. | |
| 9,760,527 B2 | 9/2017 | Egi et al. | |
| 10,037,203 B1 | 7/2018 | Chavez et al. | |
| 2002/0144035 A1* | 10/2002 | Matsuo | G06F 9/4403 710/100 |
| 2002/0191247 A1 | 12/2002 | Lu et al. | |
| 2003/0225986 A1 | 12/2003 | Teshima | |
| 2004/0205776 A1 | 10/2004 | Harrington et al. | |
| 2006/0218545 A1 | 9/2006 | Taguchi | |
| 2007/0050538 A1 | 3/2007 | Northcutt et al. | |
| 2007/0094656 A1 | 4/2007 | Talati et al. | |
| 2008/0162807 A1 | 7/2008 | Rothman et al. | |
| 2008/0215915 A1 | 9/2008 | Zhou et al. | |
| 2009/0217023 A1 | 8/2009 | Griech et al. | |
| 2011/0035740 A1 | 2/2011 | Powell et al. | |
| 2011/0093843 A1 | 4/2011 | Endo et al. | |
| 2012/0005461 A1 | 1/2012 | Moir et al. | |
| 2012/0110150 A1 | 5/2012 | Kosuru et al. | |
| 2012/0174124 A1 | 7/2012 | Ward et al. | |
| 2013/0132587 A1 | 5/2013 | Morris | |
| 2013/0326126 A1* | 12/2013 | Kondoh | G06F 8/65 711/103 |
| 2014/0095624 A1 | 4/2014 | Quan | |
| 2014/0122802 A1 | 5/2014 | Koka et al. | |
| 2014/0280687 A1 | 9/2014 | Egi et al. | |
| 2014/0314417 A1 | 10/2014 | Leigh et al. | |
| 2015/0120809 A1 | 4/2015 | Braemer et al. | |
| 2015/0149658 A1 | 5/2015 | Wei | |
| 2015/0212908 A1 | 7/2015 | Andrews et al. | |
| 2015/0271865 A1 | 9/2015 | Carson et al. | |
| 2015/0341229 A1 | 11/2015 | Richter et al. | |
| 2015/0378706 A1 | 12/2015 | Roese et al. | |
| 2016/0055119 A1 | 2/2016 | Egi et al. | |
| 2016/0092203 A1 | 3/2016 | Filali-Adib et al. | |
| 2016/0232010 A1 | 8/2016 | Dicks et al. | |
| 2016/0246652 A1 | 8/2016 | Herdrich et al. | |
| 2016/0306623 A1 | 10/2016 | Su et al. | |
| 2016/0366498 A1 | 12/2016 | Robinson et al. | |
| 2017/0054603 A1 | 2/2017 | Kulkarni et al. | |
| 2017/0149880 A1 | 5/2017 | Lochhead et al. | |
| 2017/0364428 A1 | 12/2017 | Jeyaraman et al. | |
| 2018/0024964 A1 | 1/2018 | Mao et al. | |
| 2018/0026851 A1 | 1/2018 | Adiletta et al. | |
| 2018/0027681 A1 | 1/2018 | Davis et al. | |
| 2018/0081709 A1 | 3/2018 | Okazaki | |
| 2018/0136940 A1* | 5/2018 | Mallichan | G06F 9/4406 |
| 2018/0150343 A1 | 5/2018 | Bernat et al. | |
| 2019/0028345 A1 | 1/2019 | Kommula et al. | |
| 2019/0028348 A1 | 1/2019 | Chai | |
| 2019/0028400 A1 | 1/2019 | Kommula et al. | |
| 2019/0034383 A1 | 1/2019 | Schmisseur et al. | |

OTHER PUBLICATIONS

P. Hosek and C. Cadar, "Safe software updates via multi-version execution," 2013 35th International Conference on Software Engineering (ICSE), San Francisco, CA, 2013, pp. 612-621. (Year: 2013).

Hewlett Packard Enterprise, "HPE Synergy: The first platform architected for composability to bridge Traditional and Cloud Native apps," Feb. 2016, last retrieved from https://h20195.www2.hpe.comN2/getpdf.aspx/4AA6-3257ENW.pdf? on Sep. 2, 2019. (Year: 2016).

* cited by examiner

ROLLING UPGRADES IN DISAGGREGATED SYSTEMS

CROSS REFERENCE TO RELATED APPLICATIONS

This Application is a Continuation of U.S. patent application Ser. No. 15/398,350, filed on Jan. 4, 2017.

BACKGROUND OF THE INVENTION

Field of the Invention

The present invention relates generally to large scale computing, and more particularly to upgrading distributing hardware resources for enhanced computing efficiency.

Description of the Related Art

A popular type of large scale computing is cloud computing, in which resources may interact and/or be accessed via a communications system, such as a computer network. Resources may be software-rendered simulations and/or emulations of computing devices, storage devices, applications, and/or other computer-related devices and/or services run on one or more computing devices, such as a server. For example, a plurality of servers may communicate and/or share information that may expand and/or contract across servers depending on an amount of processing power, storage space, and/or other computing resources needed to accomplish requested tasks. The word "cloud" alludes to the cloud-shaped appearance of a diagram of interconnectivity between computing devices, computer networks, and/or other computer related devices that interact in such an arrangement.

Cloud computing may be provided as a service over the Internet, such as in the form of "Infrastructure as a Service" (IaaS), "Platform as a Service" (PaaS), and/or "Software as a Service" (SaaS). IaaS may typically provide physical or virtual computing devices and/or accessories on a fee-for-service basis and onto which clients/users may load and/or install, and manage, platforms, applications, and/or data. PaaS may deliver a computing platform and solution stack as a service, such as, for example, a software development platform, application services, such as team collaboration, web service integration, database integration, and/or developer community facilitation. SaaS may deploy software licensing as an application to customers for use as a service on demand. SaaS software vendors may host the application on their own clouds or download such applications from clouds to cloud clients, disabling the applications after use or after an on-demand contract expires.

The provision of such services allows a user access to as much in the way of computing resources as the user may need without purchasing and/or maintaining the infrastructure, such as hardware and/or software, that would be required to provide the services. For example, a user may instead obtain access via subscription, purchase, and/or otherwise securing access. Thus, cloud computing may be a cost effective way to deliver information technology services. However, cloud computing may also be hindered by issues of resource configuration and allocation aspects. There is a fundamental need to enhance and improve upon the structures and systems supporting these services.

SUMMARY OF THE INVENTION

Various embodiments for performing rolling software upgrades in a disaggregated computing environment, by a processor device, are provided. In one embodiment, a method comprises providing a rolling upgrade manager for upgrading one or more disaggregated servers; using a designated memory area for storing an updated software component; switching a disaggregated server to the designated memory area from a currently assigned memory area when performing the software upgrade; and commensurate with performing the software upgrade, maintaining a process state and program data in the currently assigned memory area while maintaining the updated software component in the designated memory area such that the process state and program data are read from the currently assigned memory area and the updated software component is read from the designated memory area during currently executing operations of the disaggregated server In addition to the foregoing exemplary embodiment, various other system and computer program product embodiments are provided and supply related advantages. The foregoing Summary has been provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
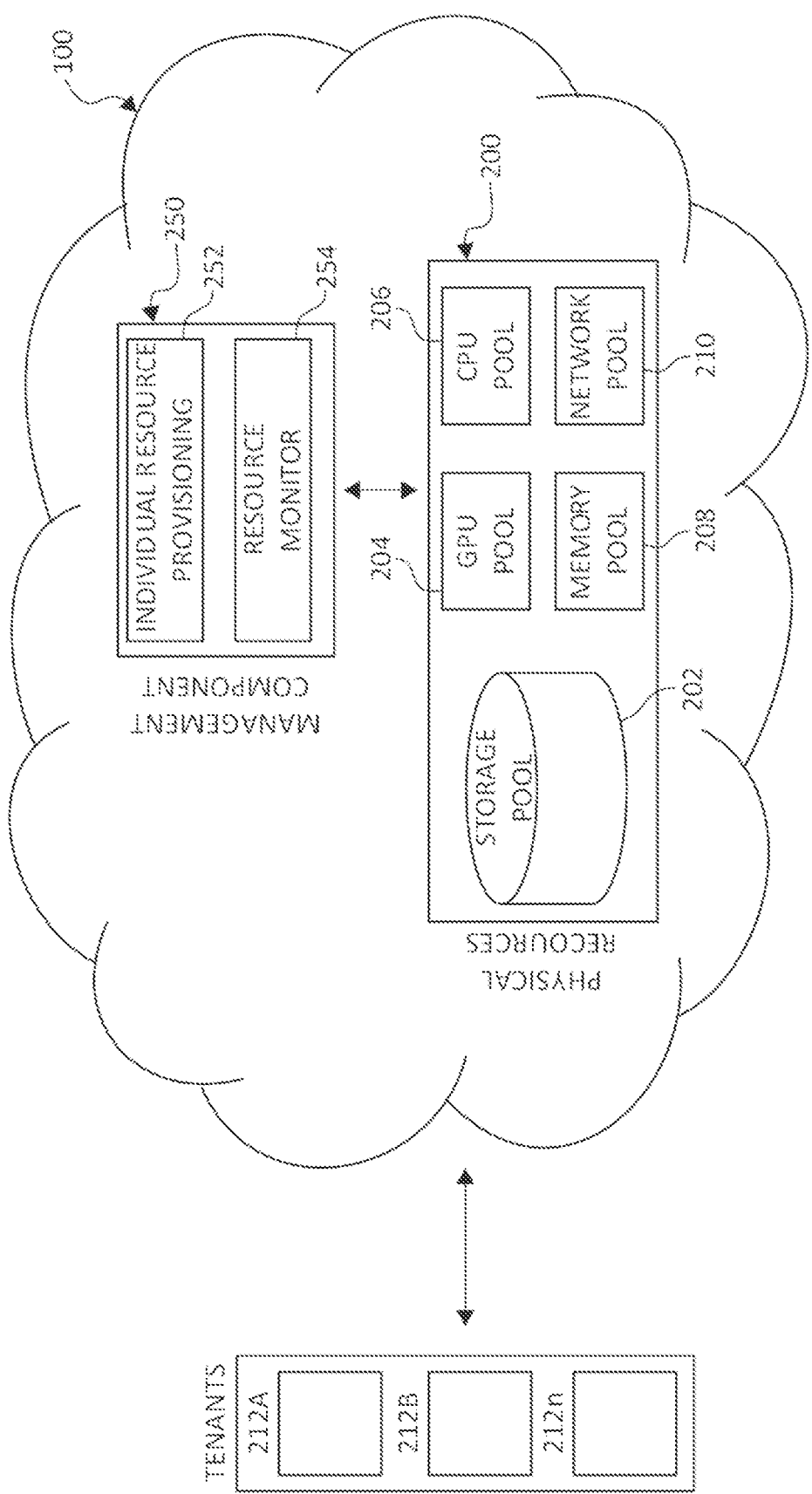
FIG. 1 is a block diagram showing a hardware structure of a disaggregated computing environment, in which aspects of the present invention may be realized.

Computing resources are usually pre-configured by vendors at fixed levels of configurations. One aspect is that each individual computing resource, such as memory size, number of CPUs, disk size, etc. has a limited boundary. Another aspect is that each computing platform has a limited number of physical customization options. Today's workloads are running under these limitations, which subsequently is a reason that techniques such as memory swapping and caching optimization are used in computing environments.

The emergence of cloud computing changes the paradigm of how people utilize computing resources by providing a pay-as-you-go model. The public cloud has been created by service providers to allow access to those who need such computing resources on demand. As aforementioned, access to cloud resources is provided through the Internet or private network connections or through co-location of fixed infrastructure held as a base, augmented by on demand resources when needed. The underlying infrastructure, however, is a set of fixed computing configurations which provide inflexibility when scaling or descaling demands are appropriate.

The underlying architecture of the Infrastructure as a Service (IaaS) cloud is generally traditional hardware used in data centers as described above. Users either access the hardware directly, or access virtual machines contained thereon. However, because of the fixed nature of building servers as enclosures that are configured once, when the enclosure is built, the fundamental architecture underneath the data center is very rigid and inflexible. It is thus the cloud software that provides the emulation to create the flexible, on-demand functionality that cloud services are known for. This functionality is quite limited however, as many mechanisms depend on software relying on server enclosures, which architectures originated early in the Personal Computer era, turning into an on-demand service.

The Virtual Machine (VM) is a software technique based on an entity that runs on a part of a server, possibly with other such entities sharing the same server. It represents the unit of on-demand computation, where each such entity is designated with a pre-defined number of virtual CPUs and memory. Once defined, a VM cannot change its base resources, such as adding memory or adding virtual CPUs. This is because such a VM shares the hardware resources of a fixed pre-built server enclosure with other VMs, and it may not be possible to displace other users to make room for the resource expansion of the first user. While such is possible in principle (e.g. by migrating other users (live VM migration) to other servers), such an operation would create an abundant increase in traffic and require an overload on a datacenter network. In addition, the provisioning of new VMs on-demand can take an impractical amount of time, relatively speaking (e.g. minutes, while real-world events may require a response to events in sub-second times). Thus the notion of true, real-world and corresponding on-demand cloud infrastructure does not exist. This situation may force users to provision resources for worse-case needs (max processor number/speed, max memory) and to keep VMs even if unneeded, only to be able to respond to real-world events in relative time.

For cloud services achieved via Application Programming Interfaces (APIs), users do not access the operating system directly, but rather issue requests via the APIs. The computation is then handled by the underlying operating system and hardware infrastructure. Some vendors provide a certain level of scaling and elasticity that are transparent to user APIs. However, the level of scaling is limited by the type of application and by the capacity of the individual computing resource. For example, if a workload requires a high demand of memory usage, it is not possible to scale up on memory size individually. Therefore, the overall resource utilization is poor and this solution is not cost-effective either.

In view of the forgoing, disaggregated computing systems provide flexibility and elasticity in constructing bare-metal computing systems for use in the cloud, to provide on-demand flexibility to cloud users, or "tenants". A disaggregated computing system is referred to as a system with large pools of physical hardware resources, such as CPUs, accelerators, memory devices, and storage devices, whose connectivity with each other individual hardware resource can be dynamically switched without shutting down any hardware nor running applications. Individual hardware resources from these pools can be selected to assemble computer systems on-demand. Thus, a bare-metal computer system with a flexible capacity of individual computing resources may be assembled in a disaggregated system, such that workloads are computed based on hardware resource configurations that are most suitable for the respective workload. In one embodiment, for example, a system may be constructed with an extremely high capability of memory size but with a more moderate capacity of CPU and other resources, for a memory-intensive workload. This functionality is enabled by the use of point-to-point circuit wire level switching. All disaggregated system proposals currently known in the art are copy-based systems in which a process state is copied over a memory fabric to local memory at the computation hardware because of the latency in connecting directly to the pool over the memory fabric or over a symmetric multiprocessing (SMP) system. This means that switching between computing components cannot happen in milliseconds as can the point-to-point circuit wire level switching mechanisms used in the present invention thereby enabling a continuous, instantaneous execution of processes even while the computing components are switched.

One advantageous component of disaggregated computing systems is the opportunity to perform computation between various hardware resources in ways previously unattainable. For example, in most pre-configured computing systems, pre-fetching techniques and data locality help to keep cache hit rates high, enabling ultra-fast performance for the end user. However, if the processor spends a vast amount of time finding the needed data in the cache, it may be under-utilizing bandwidth to main memory. Since the disaggregated architecture permits additional processing components to be connected to various memory pool modules, a method to better utilize this bandwidth to memory modules is proposed by efficiently connecting to the memory modules from other processing components (during times of low usage) to perform analytic functions which may lead to valuable insights about the data, or its processing. Such memory access will not pass through the usual SMP fabric connecting processors, and hence does not disturb inter-processor communication and coherency when really needed, increasing efficiency further.

With the foregoing being considered, in order to install new software updates in a computer system, the system typically has to be brought down (e.g. taken offline), or the code execution is temporarily stopped. Alternatively, rolling upgrades are used where only one part of a system is stopped to get upgraded, whereas the rest of the system continues to run. In this way, the end user does not notice any interruptions in operations.

However, in traditional, rigid systems (non-disaggregated systems), during an operating system upgrade, a server, whether physical or virtual, is shut down or stopped. Upgrades are then performed, and the server it is brought up again. During this time the server is not operational. There is need to dynamically upgrade systems without any downtime and system interrupts to the customer.

Accordingly, the present invention leverages the flexibility of disaggregated systems to perform rolling software upgrades to software components of the disaggregated systems ("composed" or "effective" disaggregated servers). The functionality of the present invention provides a rolling upgrade manager to perform rolling upgrades on the disaggregated servers by storing an updated software component in a designated memory area, which is then switched into the effective disaggregated server without causing interruption to the operation of the disaggregated server, its tenants, or workloads.

Turning now to FIG. 1, a block diagram of a disaggregated computing environment is illustrated, including cloud environment 100. Within cloud environment 100 is the disaggregated computing system comprising physical hardware resources 200. Physical hardware resources 200 may comprise of classifications of the hardware resources such as a storage device pool 202, a Graphics Processing Unit (GPU) device pool 204, a CPU device pool 206, a memory device pool 208, and a network device pool 210. The physical hardware resources 200 are in communication with a management module 250. Management module 250 may comprise of such components as an individual resource provisioning component 252 and a resource monitor 254, each described herein.

In communication with the cloud environment 100, the management module 250, and the physical hardware resources 200, are tenants 212A, 212B, and 212n. Tenants 212A, 212B, and 212n may communicate with the cloud environment 100 by way of the management module 250, and thus the physical resources 200 provided by any signal-bearing medium.

Figure 2:
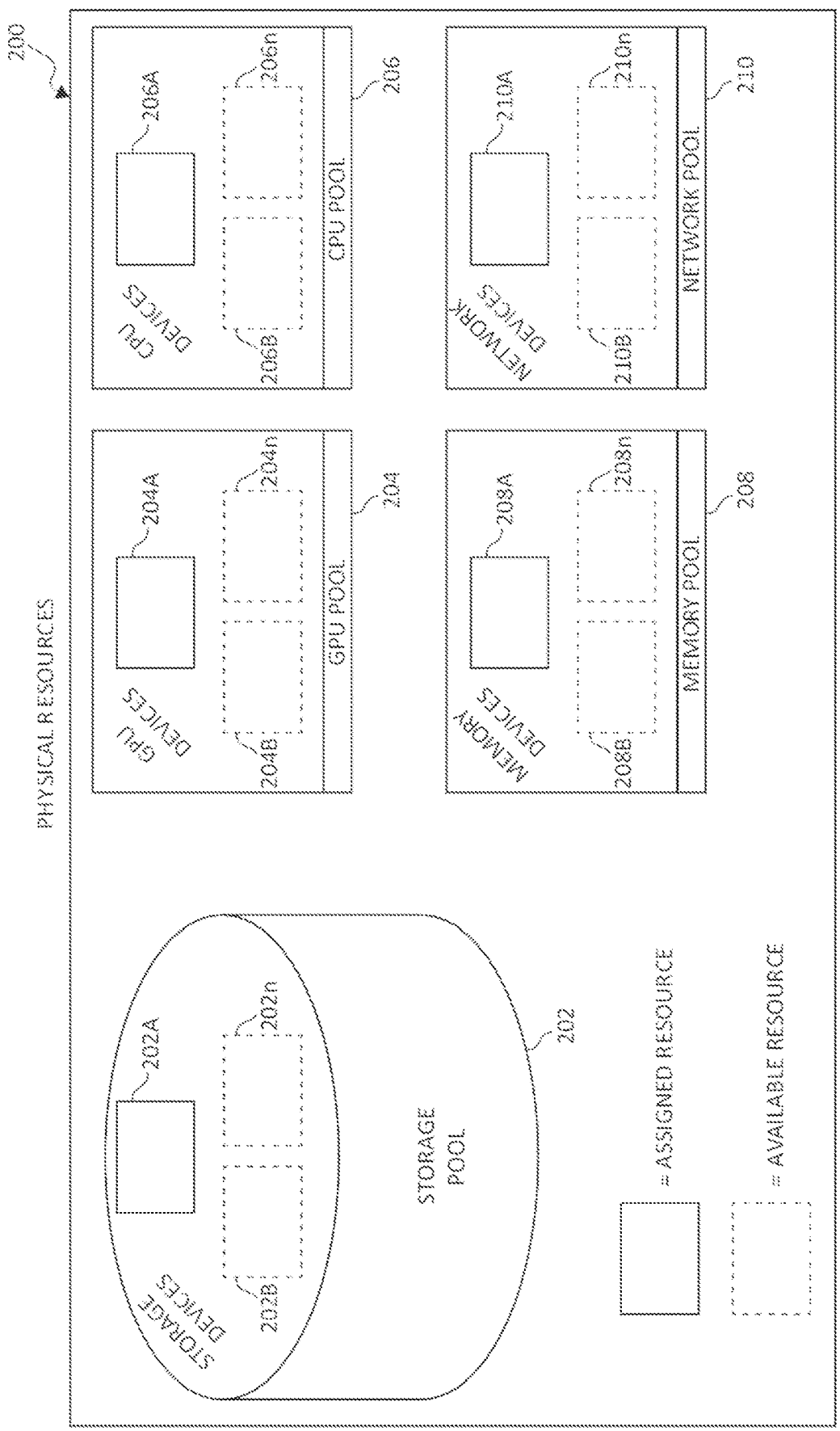
FIG. 2 is an additional block diagram showing a hardware structure of a disaggregated computing environment, in which aspects of the present invention may be realized.

It should be noted that the elements illustrated in FIG. 2 provide only an example of related components that may be included in the disaggregated computing architecture. For example, management module 250 may include other components than individual resource provisioning component 252 and resource monitor 254, and physical hardware resources 200 may include other component classifications than storage device pool 202, GPU device pool 204, CPU device pool 206, and memory device pool 208, while staying in spirit and scope of the present invention. Additionally, the duties of the management module 250, and thus the components therein, may be performed and comprised of physical components, computer code, or a combination of such.

In one embodiment, the management module 250 interacts with individual tenants 212A-n to receive workload requests and locate the best suitable hardware resources for the given workload. Individual hardware resources of the hardware resources 200 are tracked and a mapping is maintained between each respective tenant 212A-n and respective assigned hardware resource. Each hardware resource is identified using a unique identifier. This identifier may be a physical identifier (e.g. barcode) and/or a virtual identifier (e.g. code based). The management module 250, or any other suitable modules or means known in the art may be used to accomplish these mechanisms.

FIG. 2 is a block diagram illustrating the physical hardware resources 200 portion of FIG. 1. Included in the storage device pool 202 are storage devices 202A, 202B, and 202n. The GPU device pool 204 includes GPU devices 204A, 204B, and 204n. The CPU device pool 206 includes CPU devices 206A, 206B, and 206n. The memory device pool 208 includes memory devices 208A, 208B, and 208n. Finally, the network device pool 210 includes network devices 210A, 210B, and 210n. Each aforementioned hardware resource may be in communication with an additional one or more aforementioned hardware resources via a signal-bearing medium.

Within physical hardware resources 200, each hardware resource appearing in solid line (i.e. storage device 202A, GPU device 204A, CPU device 206A, memory device 208A, and network device 210A) are assigned hardware resources to one or more tenants (i.e. tenants 212A, 212B, 212n). Hardware resources appearing in dashed line (i.e. storage devices 202B, 202n, GPU devices 204B, 204n, CPU devices 206B, 206n, memory devices 208B, 208n, and network devices 210B, 210n) are unassigned hardware resources which are available on-demand for a respective tenant 212A-n workload.

Each respective tenant 212A-n may be assigned individual respective hardware resources 200 in arbitrary quantities. In one embodiment, each respective tenant 212A-n may be assigned an arbitrary quantity of an individual respective hardware resource 200 within a limit of total system capacity and/or an available quantity of the respective hardware resources 200. For example, a memory device 208A-n allocated from the memory pool to a respective tenant 212A-n may be provided in a minimal unit of allocation (e.g. a byte or word) up to a limit of total system capacity and/or an available quantity of the memory devices 208A-n.

In another embodiment, each respective tenant 212A-n may be assigned individual respective hardware resources 200 within a quantum step sizing restriction. For example, memory devices 208A-n may need to be allocated on quantum sizes of full or half of memory DIMM units, to assure full bandwidth from the respective memory device 208A-n to the processor when reading/writing data. This is especially true in a disaggregated system since the memory device 208A-n is directly connected via fiber/optical switch to the processor memory unit (for read/write memory transactions) as if it was locally connected to the processor chip, but rather may be a small distance (e.g. 1 meter) away in location. In another example, because the disaggregated system is not based on virtual components but rather physical components (i.e. actual chips than cores or VMs), the quantum sizing restriction may require that a minimum of one CPU device 206A-n be assigned to a tenant 212A-n, with additional CPU devices 206A-n being provisioned to the tenant 212A-n in two, four, etc. quantities.

Rolling Software Upgrades

In various embodiments, the functionality of the present invention leverages the point-to-point circuit wire level switching and hardware pooling attributes of disaggregated systems to provide an efficient mechanism for rolling software upgrades. As aforementioned, in this type of disaggregated system, like resources are organized into pools which can be directly connected to resources of another pool. An effectively provisioned "system" will be composed of a set of computing resources connected in a point-to-point fashion to memory and storage resources, etc.

Thus, in a disaggregated system, rolling upgrades allow a new, unprecedented level of flexibility. The present invention uses this flexibility to provide a rolling upgrade management system, where one or several CPUs are performing upgrades in a way that an individual disaggregated server experiences virtually no interruption of operation.

Figure 3:
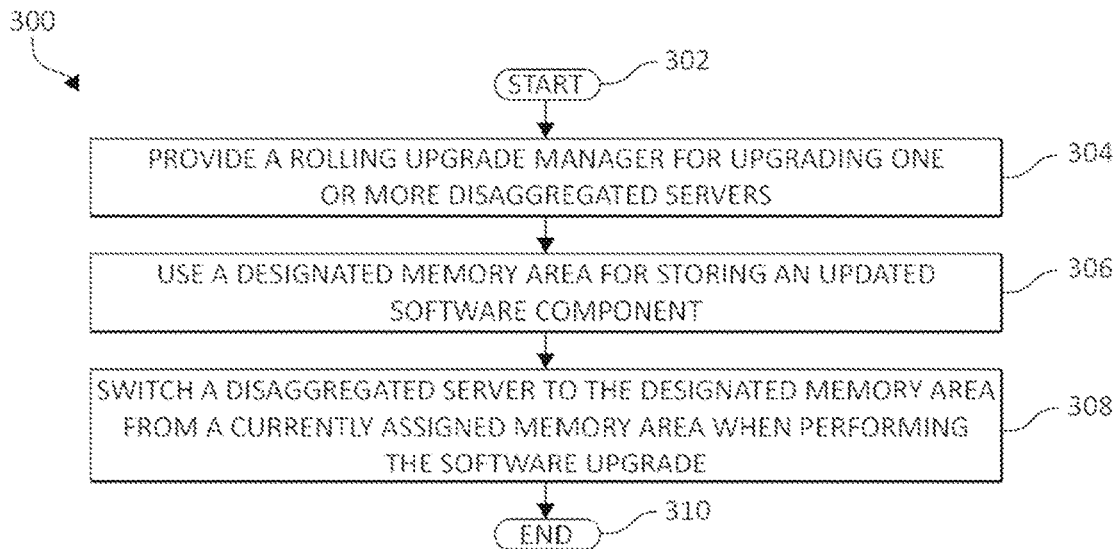
FIG. 3 is a flow chart diagram illustrating a method for performing rolling software upgrades in a disaggregated computing environment in accordance with various aspects of the present invention.

FIG. 3 illustrates a method 300 for performing rolling software upgrades in a disaggregated computing environment. The method 300 may be performed in accordance with the present invention in any of the environments depicted in FIGS. 1 and 2, among others, in various embodiments. Of course, more or less operations than those specifically described in FIG. 3 may be included in method 300, as would be understood by one of skill in the art upon reading the present descriptions.

Each of the steps of the method 300 may be performed by any suitable component of the operating environment. For example, in various embodiments, the method 300 may be partially or entirely performed by a processor, or some other device having one or more processors therein. The processor, e.g., processing circuit(s), chip(s), and/or module(s) implemented in hardware and/or software, and preferably having at least one hardware component may be utilized in any device to perform one or more steps of the method 300. Illustrative processors include, but are not limited to, a Central Processing Unit (CPU), an Application Specific Integrated Circuit (ASIC), a Field Programmable Gate Array (FPGA), etc., combinations thereof, or any other suitable computing device known in the art.

The method 300 begins (step 302) by providing a rolling upgrade manager for upgrading one or more disaggregated servers (step 304). A designated memory area is used for storing an updated software component (step 306). When performing the software upgrade, a disaggregated server is switched to the designated memory area from a currently assigned memory area (step 308). The method 300 ends (step 310).

The present invention includes components such as a rolling upgrade manager, one or more ("composed") disaggregated servers to be upgraded (i.e. disaggregated servers needing a software update of some type), and a new, designated memory area, as will be described. In one embodiment, the rolling upgrade manager functionality is provided by any whole or portion of one of a multiplicity of disaggregated servers in the disaggregated computing environment. Thus, one may think of the rolling upgrade manager as a specific disaggregated server (having its own assigned resources) in the disaggregated computing environment assigned to perform the task of providing the rolling updates to each of the other disaggregated servers within the environment having a software component which is to be updated. For example, the rolling upgrade manager may be a disaggregated server formed from individual resources obtained from the CPU device pool 206, GPU device pool 204, memory device pool 208, network device pool 210, and storage device pool 202.

Figure 4:
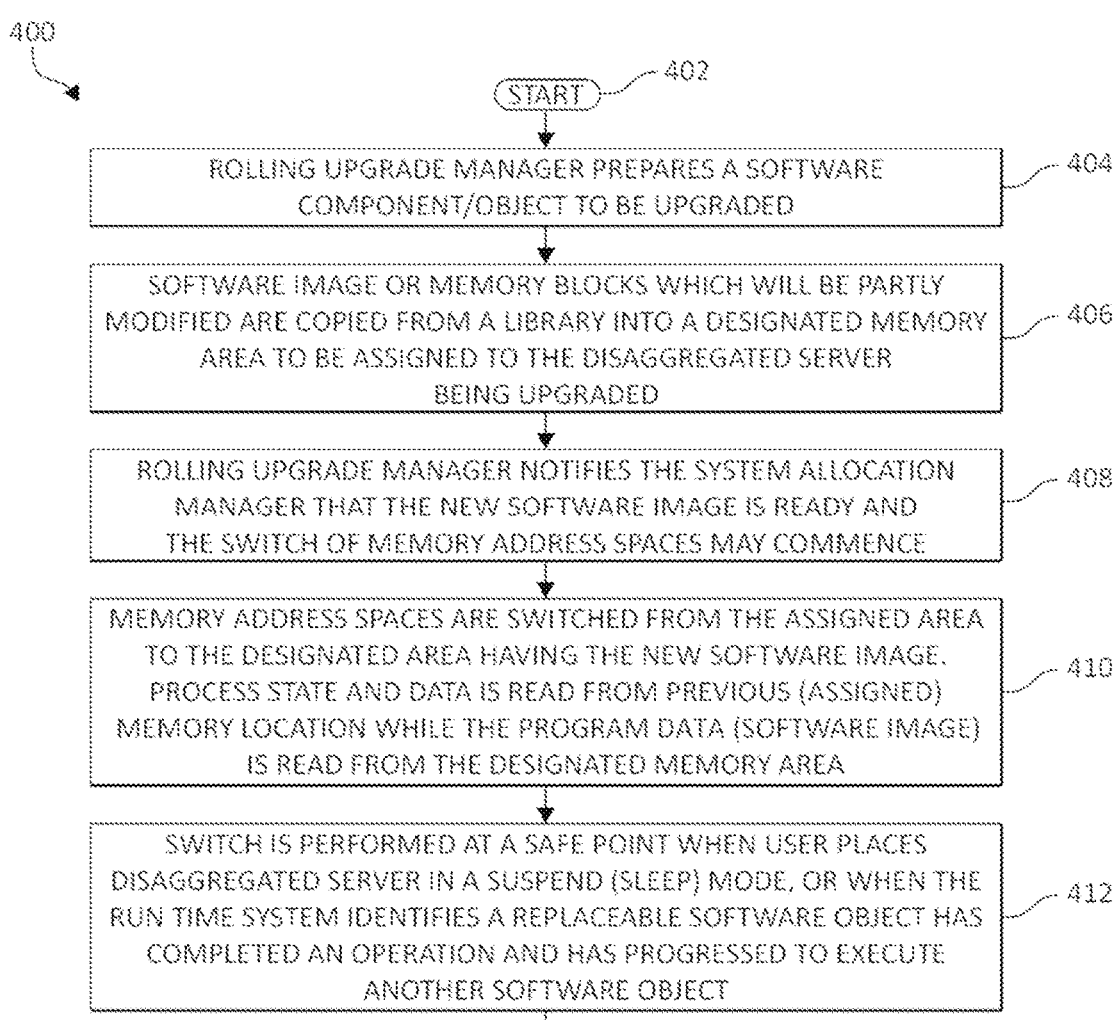
FIG. 4 is an additional flow chart diagram illustrating a method for performing rolling software upgrades in a disaggregated computing environment in accordance with various aspects of the present invention.

Continuing, FIG. 4 illustrates a method 400 for performing rolling software upgrades in a disaggregated computing environment. The method 400 may be performed in accordance with the present invention in any of the environments depicted in FIGS. 1 and 2, among others, in various embodiments. Of course, more or less operations than those specifically described in FIG. 4 may be included in method 400, as would be understood by one of skill in the art upon reading the present descriptions.

Each of the steps of the method 400 may be performed by any suitable component of the operating environment. For example, in various embodiments, the method 400 may be partially or entirely performed by a processor, or some other device having one or more processors therein. The processor, e.g., processing circuit(s), chip(s), and/or module(s) implemented in hardware and/or software, and preferably having at least one hardware component may be utilized in any device to perform one or more steps of the method 400. Illustrative processors include, but are not limited to, a Central Processing Unit (CPU), an Application Specific Integrated Circuit (ASIC), a Field Programmable Gate Array (FPGA), etc., combinations thereof, or any other suitable computing device known in the art.

The method 400 begins (step 402) with the rolling upgrade manager preparing a software component or software object to be up upgraded (step 404). In this step, software objects are placed on memory boundaries (e.g. on a 1G memory address boundary). Hence, process state, program, and data are located in different memory locations at different addresses. A memory pool controller maps various objects into different physical dual in-line memory modules (DIMMs).

The rolling upgrade manager prepares the software component, which can be the operating system (OS), middleware or application software, to the designated memory area. Once the software component is prepared, in one embodiment, a software image of the updated software component is copied from a library into a designated memory area which will be assigned to the disaggregated server to be upgraded. In another embodiment, only memory blocks which will be partly modified are copied (step 406). The designated memory area in which the software image is copied to is located on its own, individual DIMM (i.e. one of the memory devices 208A-n).

Once the software image of the updated software component is prepared and ready, the rolling upgrade manager notifies a system allocation manager that the updated software image is ready and that a switch of memory address spaces may be made (step 408). The system allocation manager may be a portion of the management component 250 or otherwise a management module of the composed disaggregated server.

To perform the upgrade of the software component on the disaggregated server, the switch of the memory address spaces is completed. In this step, memory address spaces are switched in the disaggregated server from the existing (assigned) memory to the designated memory area holding the new software image. In performing the switch, previous (existing) process state and data are kept and only the software object in the designated memory is used. Thus, the process state and data will continue to be read and written from the old (assigned) memory area and the program data (software image) will be read from the new (designated) memory area (step 410).

In one embodiment, an optimal time to perform the switch of memory address spaces is when a user places the disaggregated server to be upgraded in a suspended mode ("sleep"). In this mode, the process state and caches are dumped into the memory thus being coherent and the memory pool controller mapping can be safely switched from the existing software object to the new, upgraded software object. In another embodiment, the run time system can identify when the software object to be upgraded has completed a running operation or the system has progressed to execute another software object, so the software object to be upgraded can be switched without disturbing a running process (step 412).

Once using the new program (the upgraded software component), the disaggregated system may or may not be able to use the prior state and data. Ideally, the mapping of the process state and of the data is compatible, and can be directly reused. If this is not possible, a data and process state conversion must be performed. This conversion can be accomplished by performing a copy/map to translate existing state locations/data to the new designated memory area with the addresses that are matching the new software version, which can have enchanted variables/state data for additional functionality. The method 400 ends (step 414).

Figure 5:
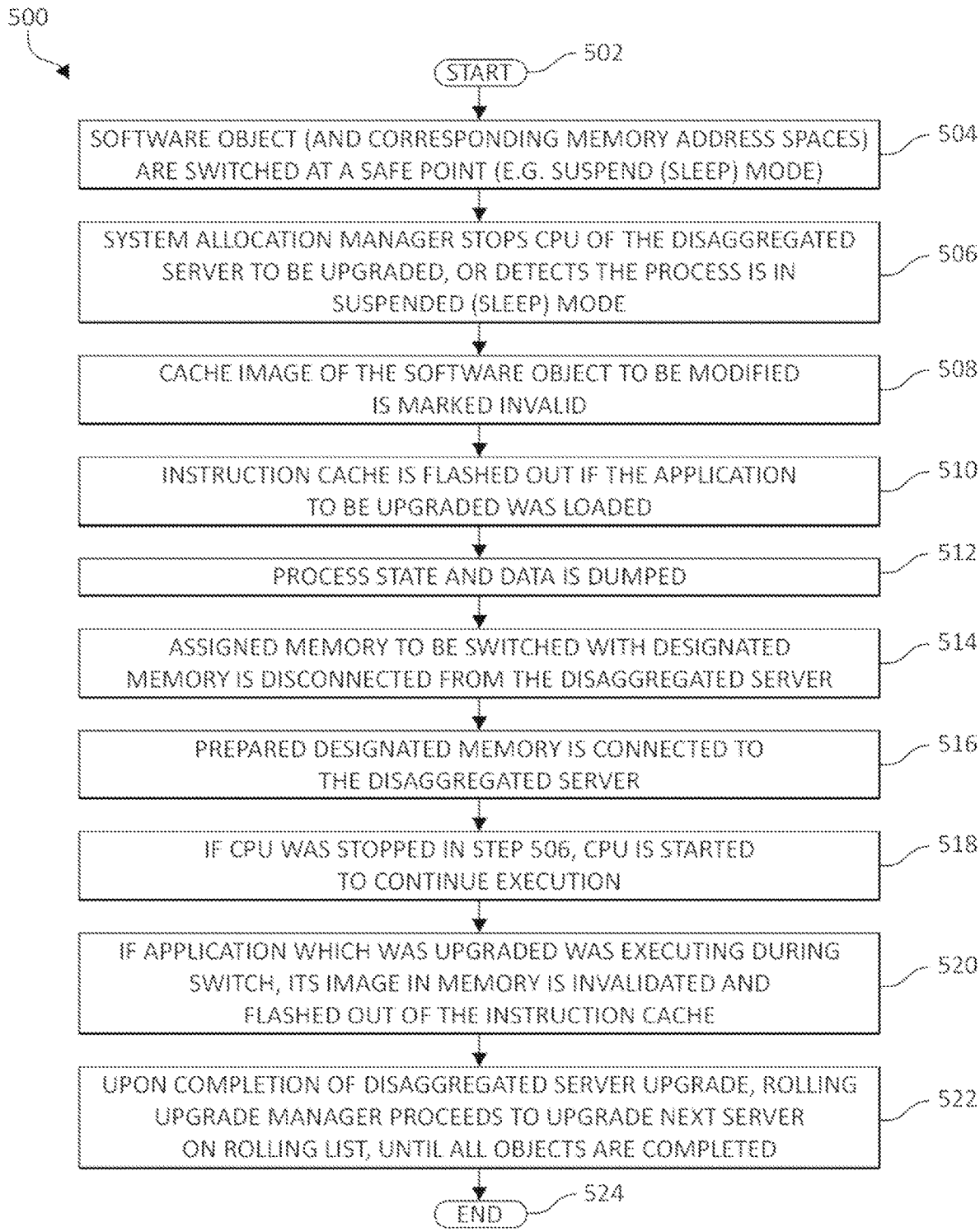
FIG. 5 is still an additional flow chart diagram illustrating a method for performing rolling software upgrades in a disaggregated computing environment in accordance with various aspects of the present invention.

FIG. 5 illustrates a method 500 for completing the rolling software upgrades in a disaggregated computing environment. The method 500 may be performed in accordance with the present invention in any of the environments depicted in FIGS. 1 and 2, among others, in various embodiments. Of course, more or less operations than those specifically described in FIG. 5 may be included in method 500, as would be understood by one of skill in the art upon reading the present descriptions.

Each of the steps of the method 500 may be performed by any suitable component of the operating environment. For example, in various embodiments, the method 500 may be partially or entirely performed by a processor, or some other device having one or more processors therein. The processor, e.g., processing circuit(s), chip(s), and/or module(s) implemented in hardware and/or software, and preferably having at least one hardware component may be utilized in any device to perform one or more steps of the method 500. Illustrative processors include, but are not limited to, a Central Processing Unit (CPU), an Application Specific Integrated Circuit (ASIC), a Field Programmable Gate Array (FPGA), etc., combinations thereof, or any other suitable computing device known in the art.

The method 500 begins (step 502) when, as aforementioned, the upgraded software object (and corresponding previously assigned and designated memory areas) is switched at a safe point, when the existing software program has finished running a block and can be switched safely (i.e. such as not to switch in the middle of running a stream of instructions from the existing program that may not match the new program memory addresses). This can be accomplished for example, when the disaggregated server is in suspend or sleep mode (so that no on-going software code is running), or if the existing program has provisions to notify the management system which software objects are "in the middle" or a process, or are complete and coherent to thus safe to switch to the new, upgraded software image (step 504).

Once a safe point to switch between the existing software component in the assigned memory area and the new software component in the designated memory area is determined, the system allocation manager then performs the following: the system allocation manager stops the CPU on the disaggregated server to be upgraded from executing, or detects that the process is in a suspended or sleep mode (step 506). The system allocation manager marks the cache image of the software object which is to be modified (upgraded) as invalid (step 508). The system allocation manager flashes out the instruction cache, if the software application to be upgraded was loaded on the disaggregated server (step 510). The system allocation manager dumps the process state and data to memory (step 512). The system allocation manager disconnects the assigned memory which is to be switched from the disaggregated server (step 514). The system allocation manager connects the newly prepared memory (the designated memory) to the disaggregated server (step 516). Finally, if the CPU was stopped in step 506, the CPU is started again to resume executing by the system allocation manager (step 518).

If the software application which was upgraded was executing at that time, its image in the memory is invalidated and flashed out of the instruction cache (step 520). Otherwise, no change to the current memory image of the disaggregated server is needed. If no partial instruction cache is possible, all of the instruction caches will be invalidated to load the new software code of the updated software component. The rolling upgrade manager holds a list of disaggregated servers having software components to be upgraded, and upon completion of the software upgrade in the disaggregated server, the rolling upgrade manager proceeds to upgrading the next disaggregated server on its list of servers to upgrade, until all objects are successfully completed and all upgrades to the software components to the disaggregated servers are performed (step 522). The method 500 ends (step 524).

The present invention may be an apparatus, a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for performing rolling software upgrades in a disaggregated computing environment, by a processor device, comprising:
   providing a rolling upgrade manager for upgrading one or more disaggregated servers;
   using a designated memory area for storing an updated software component;
   switching a disaggregated server to the designated memory area from a currently assigned memory area when performing the software upgrade; and
   commensurate with performing the software upgrade, maintaining a process state and program data in the currently assigned memory area while maintaining the updated software component in the designated memory area such that the process state and program data are read from the currently assigned memory area and the updated software component is read from the designated memory area during currently executing operations of the disaggregated server.

2. The method of claim 1, further including copying a software image of the software component from a library to the designated memory area, wherein the designated memory area is located on a separate dual in-line memory module (DIMM) than the assigned memory area.

3. The method of claim 1, wherein only memory blocks of the updated software component which will be modified are stored in the designated memory area.

4. The method of claim 1, further including:
   stopping a central processing unit (CPU) of the disaggregated server from executing;
   marking a cache image of a software component to be updated as invalid; and
   flashing out an instruction cache if the software component to be upgraded is loaded.

5. The method of claim 4, further including:
   dumping the process state and data associated with the software component to be updated;
   disconnecting the currently assigned memory area from the disaggregated server;
   connecting the designated memory area to the disaggregated server; and
   starting the CPU to resume executing.

6. The method of claim 5, further including detecting that a process associated with the software component to be updated is in a suspended or sleep mode before switching the disaggregated server from the currently assigned memory area to the designated memory area.

7. The method of claim 1, wherein the rolling upgrade manager holds a list of disaggregated servers to be updated, and upon a completion of performing the software upgrade, the rolling upgrade manager performs the using and switching for a next disaggregated server on the list.

8. A system for performing rolling software upgrades in a disaggregated computing environment, the system comprising:
   at least one processor, wherein the at least one processor:
      provides a rolling upgrade manager for upgrading one or more disaggregated servers;
      uses a designated memory area for storing an updated software component;
      switches a disaggregated server to the designated memory area from a currently assigned memory area when performing the software upgrade; and
      commensurate with performing the software upgrade, maintains a process state and program data in the currently assigned memory area while maintaining the updated software component in the designated memory area such that the process state and program data are read from the currently assigned memory area and the updated software component is read from the designated memory area during currently executing operations of the disaggregated server.

9. The system of claim 8, wherein the at least one processor copies a software image of the software component from a library to the designated memory area, wherein the designated memory area is located on a separate dual in-line memory module (DIMM) than the assigned memory area.

10. The system of claim 8, wherein only memory blocks of the updated software component which will be modified are stored in the designated memory area.

11. The system of claim 8, wherein the at least one processor:
 stops a central processing unit (CPU) of the disaggregated server from executing;
 marks a cache image of a software component to be updated as invalid; and
 flashes out an instruction cache if the software component to be upgraded is loaded.

12. The system of claim 11, wherein the at least one processor:
 dumps the process state and data associated with the software component to be updated;
 disconnects the currently assigned memory area from the disaggregated server;
 connects the designated memory area to the disaggregated server; and
 starts the CPU to resume executing.

13. The system of claim 12, wherein the at least one processor detects that a process associated with the software component to be updated is in a suspended or sleep mode before switching the disaggregated server from the currently assigned memory area to the designated memory area.

14. The system of claim 8, wherein the rolling upgrade manager holds a list of disaggregated servers to be updated, and upon a completion of performing the software upgrade, the rolling upgrade manager performs the using and switching for a next disaggregated server on the list.

15. A computer program product for performing rolling software upgrades in a disaggregated computing environment by at least one processor device, the computer program product embodied on a non-transitory computer-readable storage medium having computer-readable program code portions stored therein, the computer-readable program code portions comprising:
 an executable portion that provides a rolling upgrade manager for upgrading one or more disaggregated servers;
 an executable portion that uses a designated memory area for storing an updated software component;
 an executable portion that switches a disaggregated server to the designated memory area from a currently assigned memory area when performing the software upgrade; and
 an executable portion that, commensurate with performing the software upgrade, maintains a process state and program data in the currently assigned memory area while maintaining the updated software component in the designated memory area such that the process state and program data are read from the currently assigned memory area and the updated software component is read from the designated memory area during currently executing operations of the disaggregated server.

16. The computer program product of claim 15, further including an executable portion that copies a software image of the software component from a library to the designated memory area, wherein the designated memory area is located on a separate dual in-line memory module (DIMM) than the assigned memory area.

17. The computer program product of claim 15, wherein only memory blocks of the updated software component which will be modified are stored in the designated memory area.

18. The computer program product of claim 15, further including an executable portion that:
 stops a central processing unit (CPU) of the disaggregated server from executing;
 marks a cache image of a software component to be updated as invalid; and
 flashes out an instruction cache if the software component to be upgraded is loaded.

19. The computer program product of claim 18, further comprising an executable portion that:
 dumps the process state and data associated with the software component to be updated;
 disconnects the currently assigned memory area from the disaggregated server;
 connects the designated memory area to the disaggregated server; and
 starts the CPU to resume executing.

20. The computer program product of claim 19, further comprising an executable portion that detects that a process associated with the software component to be updated is in a suspended or sleep mode before switching the disaggregated server from the currently assigned memory area to the designated memory area.

21. The computer program product of claim 15, wherein the rolling upgrade manager holds a list of disaggregated servers to be updated, and upon a completion of performing the software upgrade, the rolling upgrade manager performs the using and switching for a next disaggregated server on the list.

* * * * *